United States Patent
Anantharaju et al.

(10) Patent No.: US 10,165,065 B1
(45) Date of Patent: Dec. 25, 2018

(54) ABUSIVE ACCESS DETECTION IN A SOCIAL NETWORKING SYSTEM

(71) Applicant: Facebook, Inc., Menlo Park, CA (US)

(72) Inventors: Srinath Anantharaju, San Francisco, CA (US); Ryan McGeehan, Palo Alto, CA (US); Michael Podobnik, San Jose, CA (US)

(73) Assignee: FACEBOOK, INC., Menlo Park, CA (US)

( * ) Notice: Subject to any disclaimer, the term of this patent is extended or adjusted under 35 U.S.C. 154(b) by 374 days.

(21) Appl. No.: 13/796,149

(22) Filed: Mar. 12, 2013

(51) Int. Cl.
 *G06F 15/16* (2006.01)
 *H04L 29/08* (2006.01)

(52) U.S. Cl.
 CPC .................................. *H04L 67/22* (2013.01)

(58) Field of Classification Search
 CPC ................. G06Q 50/01; G06F 21/604; G06F 2221/2141; H04L 67/22
 USPC ....................................................... 709/204
 See application file for complete search history.

(56) References Cited

U.S. PATENT DOCUMENTS

| | | | |
|---|---|---|---|
| 7,617,532 B1 * | 11/2009 | Alexander et al. | 726/22 |
| 8,938,500 B1 * | 1/2015 | Acharya | 709/204 |
| 2009/0089094 A1 * | 4/2009 | Stockton | G06F 21/552 705/3 |
| 2011/0283205 A1 * | 11/2011 | Nie | G06F 17/30861 715/763 |
| 2012/0023332 A1 * | 1/2012 | Gorodyansky | 713/168 |
| 2012/0036127 A1 * | 2/2012 | Work | G06Q 10/00 707/732 |
| 2012/0166533 A1 * | 6/2012 | Rubinstein et al. | 709/204 |
| 2013/0024239 A1 * | 1/2013 | Baker et al. | 705/7.28 |

* cited by examiner

*Primary Examiner* — John M Macilwinen
*Assistant Examiner* — Tan Doan
(74) *Attorney, Agent, or Firm* — FisherBroyles, LLP

(57) ABSTRACT

The disclosed techniques provide systems and methods for detecting malicious or otherwise abusive access of private end-user data in social networking systems. More specifically, various malicious action detection procedures are described for identifying a target user account that is examined via a private data access, generating a relationship scorecard including various social factors that together indicate a measure of social connectedness between a source user that initiates the private data access and the target user whose account is examined via the private data access, and making a determination as to whether the private data access is potentially abusive based on the social connectedness.

15 Claims, 8 Drawing Sheets

ABUSIVE ACCESS DETECTION IN A SOCIAL NETWORKING SYSTEM

FIELD OF THE INVENTION

The present invention generally relates to information privacy. More specifically, various embodiments of the present invention relate to systems and methods for detecting malicious or abusive access of private end-user data in social networking systems.

BACKGROUND

Companies can store a tremendous amount of end-user data. For example, end-user data can include, but is not limited to, address information, credit card information, photographs, e-mails, healthcare records, financial records, electronic documents, messages, associations with other end-users, and other types of information. Not only do the end-users have an expectation of privacy, but in many cases there can be legal requirements on the dissemination and use of the data. As a result, unauthorized access and/or use of the end-user's data can result in dissatisfied customers and potential legal liability. Accordingly, private end-user data needs to be protected from unauthorized external and internal access (e.g., from employee accounts).

In social networking systems it is advantageous to keep private end-user data available to employees as the employees may need access to private end-user data in order to perform their duties (e.g., to resolve end-user issues). Traditionally, tools for allowing employees access to private end-user data did not dynamically allocate access to the end-user data. Instead, each employee had access to all of the data or to very large portions of the data. Moreover, traditional tools also did not provide any restrictions on how the data can be used once access has been granted to the tool. One tool that has resolved these challenges and inefficiencies found in traditional tools for granting access to private end-user data is discussed in co-pending U.S. application Ser. No. 13/660,980, filed on Oct. 25, 2012, the contents of which are expressly incorporated herein by reference.

Co-pending U.S. application Ser. No. 13/660,980 discusses various systems and methods for providing token-based access control to various data sets and/or portions thereof. Thus, private end-user data can be accessed via private access tools once the appropriate token(s) are obtained. This allows the social networking systems to keep the private end-user data available to employees for expeditiously resolving end-user issues, among other important employee duties. Unfortunately, in some rare instances, an employee can abuse one or more of the access tools and/or an employee's account can be compromised. Consequently, there are a number of challenges and inefficiencies found in traditional tools for granting access to end-user data.

Overall, the examples herein of some prior or related systems and their associated limitations are intended to be illustrative and not exclusive. Upon reading the following, other limitations of existing or prior systems will become apparent to those of skill in the art.

SUMMARY

This summary is provided to introduce certain concepts in a simplified form. The concepts are further described in the Detailed Description below and the drawings. This summary is not intended to identify essential features of the claimed subject matter or to limit the scope of the claimed subject matter.

The techniques introduced herein provide systems and methods for detecting malicious or otherwise abusive access of private end-user data in social networking systems. More specifically, various malicious action detection procedures are described for identifying a target user account that is examined via a private data access, generating a relationship scorecard including various social factors that together indicate a measure of social connectedness between a source user that initiates the private data access and the target user whose account is examined via the private data access, and making a determination as to whether the private data access is potentially abusive based on the social connectedness.

The malicious action detection procedures described herein overcome the issues of the prior art because the malicious action detection tool is configured to identify any potentially abusive access and to make the appropriate notifications to one or more members of a security team.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

One or more embodiments of the present invention are illustrated by way of example and not limitation in the figures of the accompanying drawings, in which like references indicate similar elements.

Figure 1:
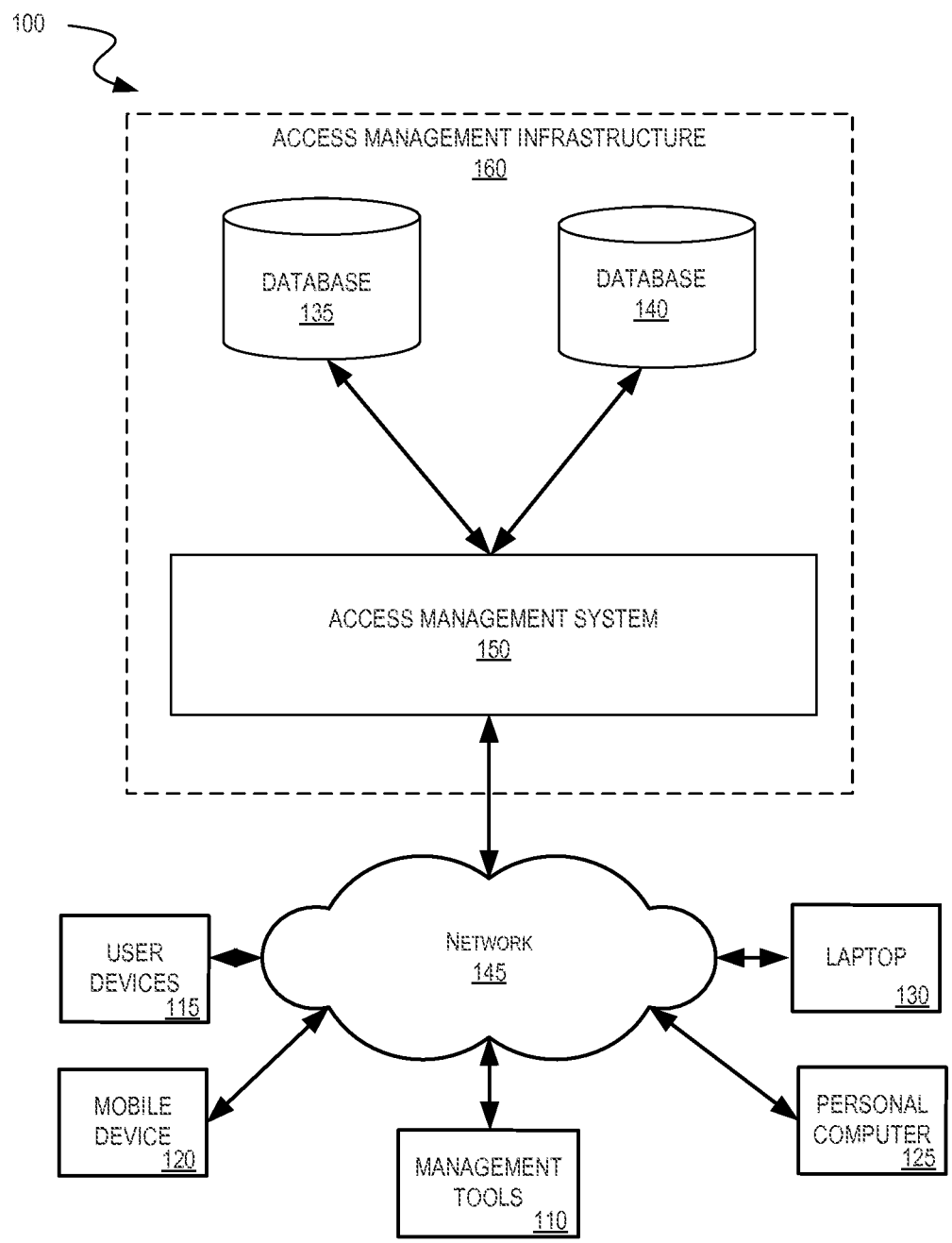
FIG. 1 depicts a block diagram illustrating an example of a networked-based environment in which some embodiments of the present invention may be utilized.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present invention generally relate to information privacy. More specifically, embodiments of the present invention relate to systems and methods for detecting malicious or abusive access of private end-user data in social networking systems. There are various tools for granting access to private end-user data. For example, private end-user data can now be accessed via private access tools once the appropriate token(s) are obtained. These tools allow the social networking systems to keep the private end-user data available to employees for expeditiously resolving end-user issues, among other important employee duties. Unfortunately, in some rare instances, employees can abuse the access tools and/or the employees accounts can be compromised.

The malicious or abusive action detection procedures and tools described herein overcome this and other issues. In one embodiment, a malicious action detection procedure identifies a private data access and determines if the private data access is potentially abusive. If the private data access is determined to be potentially abusive, the private data access is marked and one or more notifications may be sent.

In one embodiment, the malicious action detection procedures identify a target user account that is examined via a private data access, generate a relationship scorecard including various social factors that together indicate a measure of social connectedness between a source user that initiates the private data access and the target user whose account is examined via the private data access, and makes a determination as to whether the private data access is potentially abusive based on the social connectedness. In one embodiment, the potentially abusive access is made by a source user who is taking an action on a specific content page in a social network and a target user is an administrator of the page in the social network.

The various social factors can be any number of factors that are generated by an abusive access detection tool and/or other components within a social networking system. In one embodiment, the social factors include a commonalities factor and/or a coefficient factor. The commonalities factor can include a commonalities score that can indicate a measure of social traits that are common to both the source user and the target user. The social traits can be based on social relationship information (i.e., any information contained in the social networking system). Examples of social traits include, but are not limited to, users having one or more common social connections, users having common current or past residencies, and/or users having common interests. In one embodiment, the commonalities score comprises a people you may know (PYMK) score.

The coefficient factor can include a coefficient score that can indicate a measure of interactions between the source user and the target user in the social networking system. The measure of interaction can be based on a quantity or frequency of explicit actions taken by the source user with respect to the target user or taken by the target user with respect to the source user within a specified time period in the social networking system. The explicit actions can be, for example, any contact or communications between the source user and the target user in the social networking system. Examples of explicit actions include, but are not limited to, viewing items associated with the other user, liking items associated with the other user, or communicating with the other user.

In one embodiment, the other social factors can include one or more of target trait factors and/or overt action factors. A target trait factor can indicate whether the target user or target user account is associated with a pre-determined target trait. The pre-determined target trait can be, for example, the target user belonging to a sensitive affiliation, the target user being a celebrity, the target user having a familial relationship with the source user, and/or the target user being a prior social connection of the source user in the social networking system. An overt action factor can indicate whether a target user has taken a specific overt action with respect to the source user in the social networking system. For example, the specific overt action can be the target user blocking communications with the source user in the social networking system.

In one embodiment, a weight or relative importance can be applied to one or more of the social factors. For example, if the target user has blocked the source user in the social networking system then this factor in and of itself may be enough for the private data access to be flagged as potentially abusive.

The techniques introduced herein can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Although the techniques described herein are discussed with respect to a social networking system, the techniques are equally applicable to any storage and/or access system. Accordingly, the embodiments described herein are not limited to social networking systems.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary channels or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to various embodiments," "in the embodiments shown," "in other embodiments," and the like generally mean the particular feature, structure, or characteristic following the phrase is included in at least one embodiment of the present invention and may be included in more than one embodiment of the present invention. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "module" or "engine" refers broadly to software, hardware, or firmware (or any combination thereof) components. Modules or engines are typically functional components that can generate useful data or other output using specified input(s). A module may or may not be self-contained. An application program (also called an "application") may include one or more modules, or a module can include one or more application programs.

The terms "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Environment

FIG. 1 depicts a block diagram illustrating an example of a networked-based environment 100 in which some embodiments of the present invention may be utilized. Companies can generate and store a tremendous amount of data (e.g., photographs, messages, e-mails, electronic documents, or healthcare records) and related analytics (e.g., usage analytics). Much of this information is private end-user data. Private end-user data is data that is not available to and/or otherwise accessible by the general public. The data can be submitted through various management tools 110, user devices 115, mobile devices 120, personal computers 125, laptops 130, and/or other devices to allow the data to be stored on one or more databases 135 and 140. As illustrated in FIG. 1, these devices and tools may use network 145 to submit and retrieve information from the databases 135 and 140. Various embodiments of the present invention use access management system 150 within access management infrastructure 160 to detect malicious or otherwise abusive access of private end-user data that is stored on databases 135 and/or 140.

User device 115 can be any computing device capable of receiving user input as well as transmitting and/or receiving data via the network 145. In one embodiment, user device 115 is a conventional computer system, such as a desktop 125 or laptop computer 130. In another embodiment, user device 115 may be mobile device 120 having computer functionality, such as a personal digital assistant (PDA), mobile telephone, smart-phone or similar device. User device 115 is configured to communicate with access management system 150, and/or the financial account provider via the network 145. In one embodiment, user device 115 executes an application allowing a user of user device 115 to interact with the access management system 150. For example, user device 115 can execute a browser application to enable interaction between the user device 115 and access management system 150 via the network 145. In another embodiment, user device 115 interacts with access management system 150 through an application programming interface (API) that runs on the native operating system of the user device 208, such as iOS® or ANDROID™.

User devices 115 can be configured to communicate via the network 145, which may comprise any combination of local area and/or wide area networks, using both wired and wireless communication systems. In one embodiment, network 145 uses standard communications technologies and/or protocols. Thus, network 145 may include links using technologies such as Ethernet, 802.11, worldwide interoperability for microwave access (WiMAX), 3G, 4G, CDMA, digital subscriber line (DSL), etc. Similarly, the networking protocols used on network 145 may include multiprotocol label switching (MPLS), transmission control protocol/Internet protocol (TCP/IP), User Datagram Protocol (UDP), hypertext transport protocol (HTTP), simple mail transfer protocol (SMTP), and file transfer protocol (FTP). Data exchanged over network 145 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec).

Figure 2:
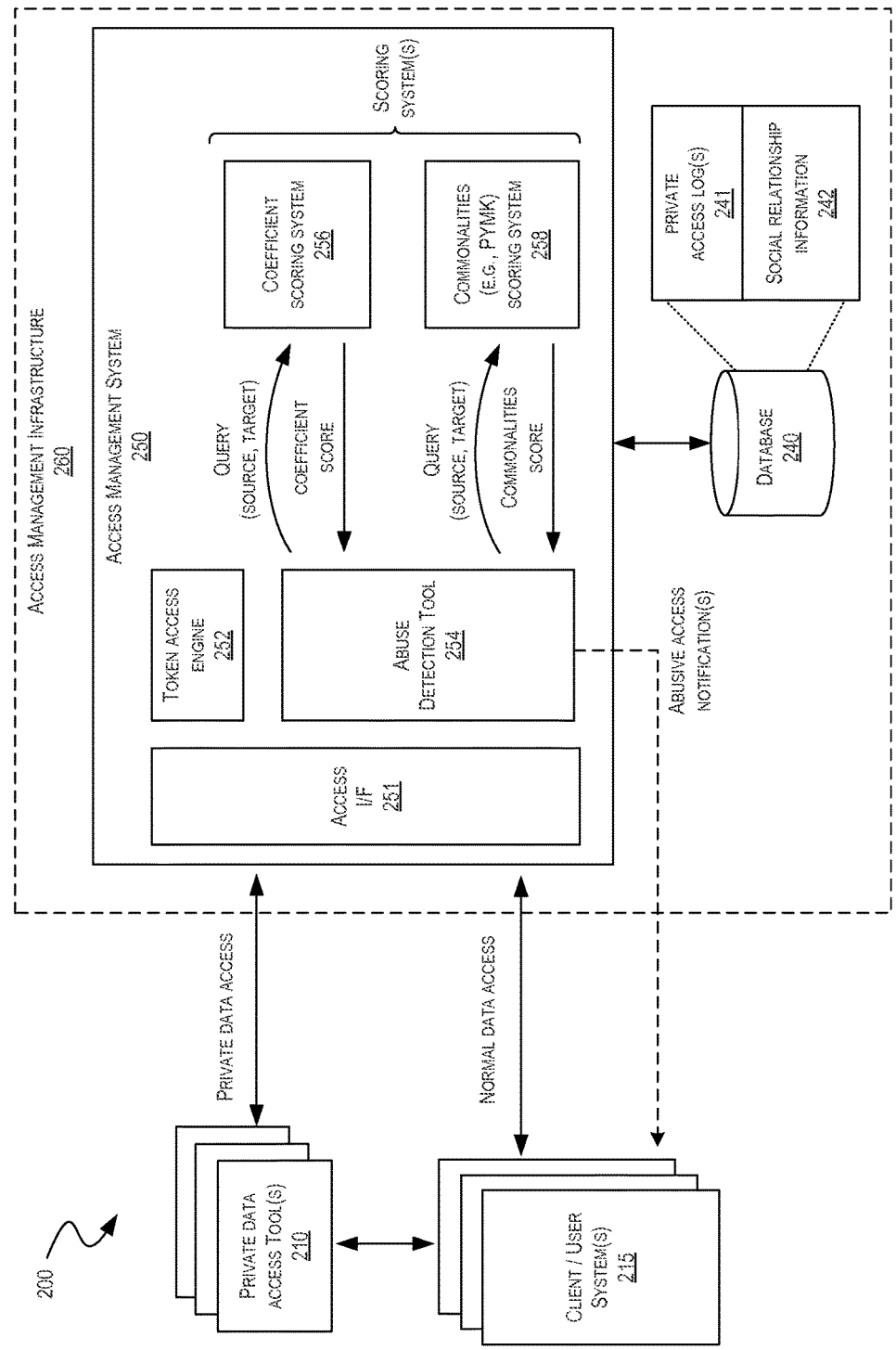
FIG. 2 depicts a block diagram illustrating an example of an access management infrastructure.

FIG. 2 depicts a block diagram illustrating a more detailed example of an access management infrastructure 260 in a networked-based example environment 200, according to an embodiment. The access management infrastructure 260 and the networked-based example environment 200 can be the access management infrastructure 160 and the networked-based example environment 100 of FIG. 1, respectively, although other configurations are possible. As shown, the networked-based example environment 200 includes various private data access tools 210, various client or user system(s) 215, and an access management infrastructure 265. Other systems, databases, and/or components are also possible.

The private data access tools 210 and the client or user system(s) 215 can be configured to communicate via one or more networks such as, for example, network 145 of FIG. 1, with the access management system 250 in order to access end-user account information (e.g., social relationship information 242). When an end-user accesses his/her own account, this end-user data access is considered to be a normal data access. In one embodiment, a normal end-user data access can include creating, generating, reading, downloading, uploading, and/or otherwise accessing or providing social relationship information. The access management system 250 stores some or all of this social relationship information in within database 240 (e.g., social relationship information 242). As described herein, the social relation information 242 can be used by an abuse detection tool 354 to detect malicious or abusive access of private end-user data in social networking system or environment.

The private data access tools 210 can, together with the access management infrastructure 260, facilitate private access to end-user data stored within the access management infrastructure 260. This end-user data access is considered private data access because someone other than the end-user of an account is accessing private (i.e., non-public) end-user information from the end-user's account. More specifically, a private data access is an access of an end-users private data via a private data access tool 210 by an authorized user (e.g., an employee) other than the end-user. As discussed above, the employee(s) may need access to the private end-user data in order to perform their duties (e.g., to resolve end-user issues). Unfortunately, in some rare instances, employees can abuse the private data access tools 210 and/or the employees accounts can be compromised resulting in abuse of the private data access tools 210.

Examples of private data access tools 210 can include, but are not limited to, tools that allow an employee to access the end-user account as if the employee is the end-user or tools that allow an employee to essentially ignore end-user privacy settings in order to access the end-user account. In one embodiment, a private end-user data access can create, generate, read, download, upload, and/or otherwise access or provide social relationship information related to the end-user. The social relationship information can be added, read, and/or deleted from the end-user's account. As shown, the private data access tools 210 are discrete tools, however, in one or more embodiments, the private data access tools 210 can be included within the access management infrastructure 260 and/or the access management system 250.

The access management infrastructure 260 can include various access management systems 250 and a database 240. As shown, the access management infrastructure 260 includes an access management system 250 and a database 240. The access management system 250 includes an access interface (I/F) 251, a token access engine 252, an abuse detection tool 254, and scoring systems 256 and 258. As shown, the access management system 250 includes the scoring systems 256 and 258, however, some or all of the scoring systems can be discrete systems that are physically and/or functionally distributed. Other systems, databases, and/or components are also possible.

The access interface 251 can be configured to facilitate communications between the access management infrastructure 260 and the various client or user system(s) 215 and/or the private data access tools 210 via a network such as, for example, network 145 of FIG. 1. The communications can, among other things, comprise normal or private data accesses.

The token access engine 252 generates unique tokens for the private data access tools so that the tools can access the private end-user data. In one embodiment, the private end-user data can be accessed via private access tools once the appropriate token(s) are obtained from the token access engine 252 of the access management system. As part of a private data access, the access management system 250 maintains various private access logs 241 in database 240. The private access logs 241 ensure that a trail or record of private data access is maintained.

The abuse detection tool (or malicious action detection tool) 254 can monitor, scan, and/or otherwise process the private data access logs 241 and/or the social relationship information 242 in order to detect malicious or abusive access of private end-user data in social networking systems. Although shown as a component of the access management system 250, the abuse detection tool 254 can comprise one or more discrete systems that are physically and/or functionally distributed.

In one embodiment, the abuse detection tool 254 identifies a target user account that has been examined via a private data access and responsively generates a relationship scorecard including various social factors that together indicate a measure of social connectedness between a source user that initiates the private data access and the target user whose account is examined via the private data access. The abuse detection tool 254 then determines whether the private data access is potentially abusive based on the relationship scorecard (i.e., the measure of social connectedness).

The various social factors can be any number of factors that are generated and/or accessed by the abusive access detection tool 254. As shown in the example of FIG. 2, the abuse detection tool 254 generates the relationship scorecard based at least on a coefficient factor and a commonalities factor.

The coefficient factor can include a coefficient score indicating a measure of interactions between the source user and the target user in the social networking system. The measure of interactions between the source user and the target user in the social networking system can be determined based on social relationship information 242 associated with the source user and the target user.

In one embodiment, the coefficient scoring system 256 determines and/or otherwise identifies a coefficient score for the source user and the target user responsive to a query from the abuse detection tool 254. The measure of interactions between the source user and the target user can be based on a quantity or frequency of explicit actions taken by the source user with respect to the target user or taken by the target user with respect to the source user within a specified time period in the social networking system. The coefficient scoring system 256 can identify the explicit actions using the social relationship information 242 in the database 240. The explicit actions can be any contact or communications exchanged between the source user and the target user in the social networking system. Examples of explicit actions include, but are not limited to, viewing items associated with the other user, liking items associated with the other user, or communicating with the other user.

The commonalities factor can include a commonalities score indicating a measure of social traits that are common to both the source user and the target user in the social networking system. The measure of social traits that are common to both the source user and the target user in the social networking system can be determined based on social relationship information 242 associated with the source user and the target user.

In one embodiment, the commonalities scoring system 258 determines and/or otherwise identifies a commonalties score for the source user and the target user responsive to a query from the abuse detection tool 254. The social traits can be based on social relationship information 242 (i.e., any information contained in the social networking system). Examples of social traits include, but are not limited to, users having one or more common social connections, users having common current or past residencies, and/or users having common interests. In one embodiment, the commonalities score comprises a people you may know (PYMK) score.

Although not shown, other social factors can also be generated, determined, and/or accessed by the abusive access detection tool 254. For example, in one embodiment, the other social factors can include one or more of target trait factors and/or overt action factors. A target trait factor can indicate whether the target user or target user account is associated with a pre-determined target trait. The pre-determined target trait can be, for example, the target user belonging to a sensitive affiliation, the target user being a celebrity, the target user having a familial relationship with the source user, and/or the target user being a prior social connection of the source user in the social networking system. An overt action factor can indicate whether a target user has taken a specific overt action with respect to the source user in the social networking system. For example, the specific overt action can be the target user blocking communications with the source user in the social networking system.

The various modules, components, and/or functions that can be associated with and/or included within an abuse detection tool 254 are discussed in greater detail with reference to FIG. 3.

Figure 3:
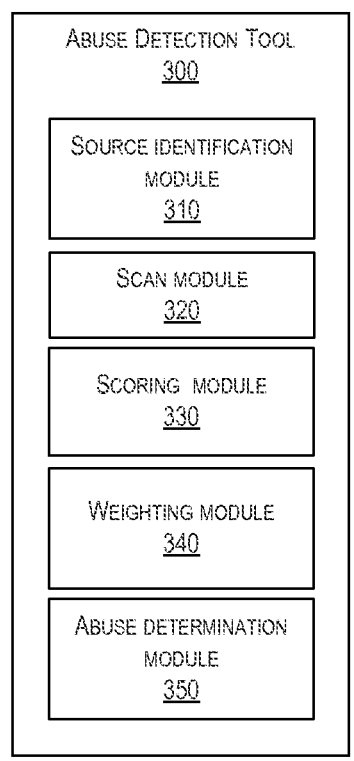
FIG. 3 depicts a block diagram illustrating an example abuse detection tool.

FIG. 3 depicts a block diagram illustrating an example abuse detection tool 300, according to an embodiment. The abuse detection tool 300 can be the abuse detection tool 254 of FIG. 2, although alternative configurations are possible. In the example of FIG. 3, the abuse detection tool 300 includes a source identification module 310, a scan module 320, a scoring module 330, a weighting module 340, and an abuse determination module 350. Additional or fewer modules are also possible.

The abuse detection tool 300, although illustrated as comprised of distributed components (physically distributed and/or functionally distributed), could be implemented as a collective element. In some embodiments, some or all of the modules, and/or the functions represented by each of the modules, can be combined in any convenient or known manner. Furthermore, the functions represented by the modules and/or engines can be implemented individually or in any combination thereof, partially or wholly, in hardware, software, or a combination of hardware and software.

The source identification module 310 is configured to identify a source account with private data access capabilities. For example, the source identification module 310 can identify employee accounts that have access to particular tools that facilitate private data access. In one embodiment, a list or database of the source accounts with private data access may be generated and/or stored. The identification process can be triggered manually or automatically (e.g., periodically or based on some event).

The scan module 320 is configured to scan the source accounts that are identified as having private data access capabilities. In one embodiment, the scan module 320 accesses private access log(s) associated with the source accounts that are identified as having private data access capabilities and scans the private access logs to determine if any private data accesses have occurred. In one embodiment, the scan module 320 may keep track of whether the private access log(s) have been previously scanned. In such a case, only the private access log(s) that have not yet been scanned are scanned for private data accesses by the scan module 320.

The scoring module 330 is configured to generate a relationship scorecard by accessing (e.g., querying one or more scoring systems for scores) and/or generating or otherwise determining a plurality of social factors that together indicate a measure of social connectedness between a source user associated with the source user account and a target user associated with the target user account. As discussed above, the plurality of social factors are based on social relationship information residing in the database (e.g., in computer memory within the social networking system). In one or more embodiments, the scoring module 330 accesses the social relationship information from the database.

The various social factors can be primary scoring signals or additional (secondary) signals. Typically, the primary scoring signals are signals that are generated by existing systems such as, for example, the coefficient scoring system and the commonalities scoring system. The scores generated by these existing systems may be used for existing purposes within the social networking system. For example, the coefficient score can be generated by a social networking system in order to determine which content items should be displayed in a first end-user's newsfeed. In some cases, a lower score can indicate that first end-user has more in common with a second end-user, and thus, the lower the score, the higher the probability that a content item from the second end-user will be displayed in the first end-user's newsfeed. The coefficient score can be based on explicit actions between the first and second users, such as, the first user viewing the second user's messages and/or posts, liking the second user's messages and/or posts, poking the second user, etc.

As discussed above, the commonalties score can be a PYMK score. The PYMK score ranks end-users in the system for the first end-user to determine how likely it is that the first end-user would like to connect (become a social connection of) the other end-users. The PYMK score can also be referred to as a soft connections score. That is, the end-users with scores higher than a threshold are considers soft-connections. Other (or secondary) social factors can also be generated, determined, and/or accessed by the abusive access detection tool based on the additional (secondary) signals. The additional (secondary) signals may or may not be scored.

For example, in one embodiment, the other social factors can include one or more of target trait factors and/or overt action factors. A target trait factor can indicate whether the target user or target user account is associated with a pre-determined target trait. The pre-determined target trait can be, for example, the target user belonging to a sensitive affiliation, the target user being a celebrity, the target user having a familial relationship with the source user, and/or the target user being a prior social connection of the source user in the social networking system. An overt action factor can indicate whether a target user has taken a specific overt action with respect to the source user in the social networking system. For example, the specific overt action can be the target user blocking communications with the source user in the social networking system.

The weighting module 340 is configured to optionally apply a weight to one or more of the primary and/or secondary factors. Additionally, in some embodiments, the weighting module 340 can also normalize one or more of the primary and/or secondary factors. An example relationship scorecard with corresponding scores is shown and discussed in greater detail with reference to FIG. 6.

The abuse determination module 350 is configured to make a determination about whether particular private data accesses are potentially abusive. In one embodiment, the determination can be made based on a final or cumulative score exceeding a threshold value. Alternatively or additionally, each factor may be taken into account individually to determine its range and a decision may be based on one or more of the individual factors.

Methods for Malicious Access Detection

Figure 4:
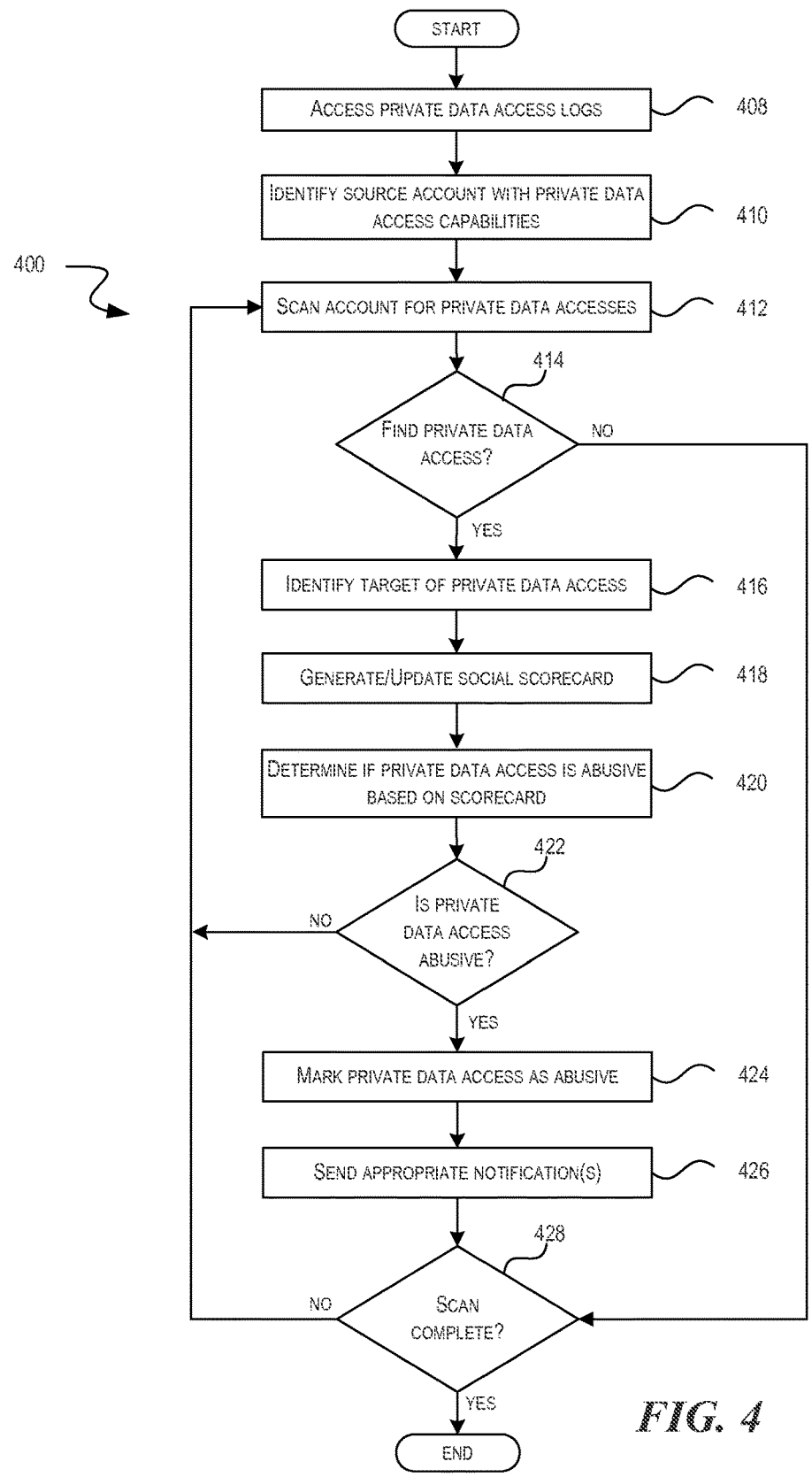
FIG. 4 depicts a flowchart illustrating an example process for determining whether private data accesses associated with a source account are potentially malicious or abusive.

FIG. 4 depicts a flowchart illustrating an example process 400 for determining whether private data accesses associated with a source account are potentially malicious or abusive, according to an embodiment. The operations illustrated in FIG. 4 may be performed in various embodiments by an abuse detection tool 254 of FIG. 2, a processor, and/or other modules, engines, components or tools associated with access management system 150 of FIG. 1. Additional or fewer steps are possible.

To begin, at step 408, the abuse detection tool accesses logs that indicate private data accesses. The private data access logs contain source account and target account identifiers. At step 410, the abuse detection tool identifies a source account with private data access capabilities. For example, the abuse detection module can identify employee or other end-user accounts that have access to particular tools that facilitate private data access. In one embodiment, a list or database of the source accounts with private data access may be generated and/or stored. As discussed above, the identification process can be triggered manually or automatically (e.g., periodically or based on some event).

At step 412, the abuse detection tool scans the identified source account for private data access. For example, as discussed above, when a source user accesses private end-user data via a private data access (e.g., using a private data access tool), the access management system 250 generates a record of the private data access that is stored in one or more databases in the form of a private access log(s). The abuse detection tool can subsequently scan the private access logs to identify whether the source user accessed private end-user data via one or more of the private data access tools.

At a determination step 414, the abuse detection tool determines whether a private data access has been found via the scan. If a private data access is not found, then the scan is completed. Otherwise, at step 416, the abuse detection tool identifies a target account of the private data access. As discussed above, a target user account is the end-user account that is examined via a private data access by the source account.

Once the target account is identified, at step 418, the abuse detection tool generates/updates a relationship scorecard including a plurality of social factors that together indicate a measure of social connectedness between a source user associated with the source user account and a target user associated with the target user account. A relationship scorecard can be generated for each source account, target account pair. As discussed above, the plurality of social factors are based on social relationship information residing in computer memory in the social networking system (i.e., on one or more databases within the access infrastructure). Each social scorecard is computed for every pair of (source, target) accounts in the private data access logs. An example relationship scorecard is discussed in greater detail with reference to FIG. 5.

At step 420, the abuse detection tool determines whether the private data access is potentially abusive based on the relationship scorecard. In one embodiment, the determination can be made based on a final or cumulative score exceeding a threshold value. Alternatively or additionally, each factor may be taken into account individually to determine if it falls within a specified range or whether it exceeds or is less than a threshold. The decision may be based on one or more of the individual factors. At a determination step 422, if the private data access is not determined to be potentially abusive, then the scan continues at step 412. Otherwise, at step 424, the abuse detection tool marks the private data access as potentially abusive and, at step 426, sends one or more notifications. The notification(s) can indicate that the private data access has been marked as potentially abusive. In one embodiment, the notification(s) are sent to one or more administrators or a security team for ultimate determination as to whether the private data access is abusive.

Lastly, at a determination step 428, the abuse detection tool determines if the scan is complete. If the scan is complete, then the process ends. Otherwise, the scan continues at step 412.

Figure 5:
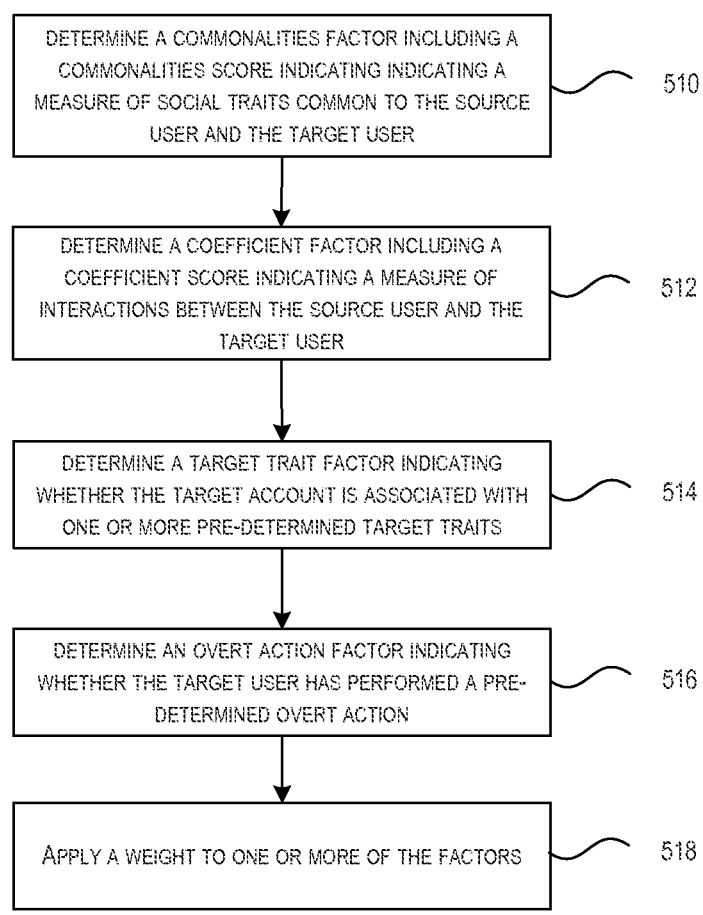
FIG. 5 depicts a flowchart illustrating an example process for generating a social scorecard for use in determining whether a private data access is potentially malicious or abusive.

FIG. 5 depicts a flowchart illustrating an example process 500 for generating a social scorecard for use in determining whether a private data access is potentially malicious or abusive, according to an embodiment. The operations illustrated in FIG. 4 may be performed in various embodiments by an abuse detection tool 254 of FIG. 2, a processor, and/or other modules, engines, components or tools associated with access management system 150 of FIG. 1. Additional or fewer steps are possible.

To begin, at step 510, the abuse detection tool determines a commonalities factor including a commonalities score that indicates a measure of social traits common to the source user and the target user in a social networking system. The measure of social traits that are common to both the source user and the target user in the social networking system can be determined based on social relationship information associated with the source user and the target user. The social traits can be based on social relationship information (i.e., any information contained in the social networking system). Examples of social traits include, but are not limited to, users having one or more common social connections, users having common current or past residencies, and/or users having common interests. In one embodiment, the commonalities score comprises a people you may know (PYMK) score.

At step 512, the abuse detection tool determines a coefficient factor including a coefficient score that indicates a measure of interactions between the source user and the target user. As discussed above, the coefficient factor can include a coefficient score indicating a measure of interactions between the source user and the target user in the social networking system.

The measure of interactions between the source user and the target user in the social networking system can be determined based on social relationship information associated with the source user and the target user. The measure of interactions between the source user and the target user can be based on a quantity or frequency of explicit actions taken by the source user with respect to the target user or taken by the target user with respect to the source user within a specified time period in the social networking system. The explicit actions can be identified using the social relationship information in the database. The explicit actions can be any contact or communications between the source user and the target user in the social networking system. Examples of explicit actions include, but are not limited to, viewing items associated with the other user, liking items associated with the other user, or communicating with the other user.

At step 514, the abuse detection tool determines a target trait factor indicating whether the target account is associated with one or more pre-determined target traits. As discussed above, a target trait factor can indicate whether the target user or target user account is associated with a pre-determined target trait. The pre-determined target trait can be, but is not limited to, the target user belonging to a sensitive affiliation, the target user being a celebrity, the target user having a familial relationship with the source user, the target user being a prior social connection of the source user in the social networking system.

At step 516, the abuse detection tool determines an overt action factor indicating whether the target user has performed a pre-determined overt action. As discussed above, the overt action factor can indicate whether a target user has taken a specific overt action with respect to the source user in the social networking system. A specific overt action can be, but is not limited to, the target user blocking communications with the source user in the social networking system.

Lastly, at step 518, the abuse detection tool optionally applies a weight to one or more of the factors. The weights can be used to make sure that a factor is given more precedence than other factors. Alternatively or additionally, the weights can be used to make sure that a private data access is marked as potentially malicious or abusive if it is present. An example relationship scorecard with corresponding scores and weights is shown and discussed in greater detail with reference to FIG. 6.

Relationship Scorecard

Figure 6:
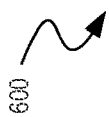
FIG. 6 depicts an table illustrating example contents of a relationship (or social) scorecard.

FIG. 6 depicts a table illustrating contents of an example relationship (or social) scorecard 600 for a source user and target user, according to an embodiment. The scorecard 600 is separated by scoring signals or factors and additional (extra) signals or factors. In the example of FIG. 6, the scoring signal includes a coefficient score, a PYMK (commonalities) score, and a combined score. The additional (extra) signals include target traits #1-#N and actions #1-#N. Each signal is shown with a weight, however, some or all of the signals may not be weighted in some embodiments. Additionally, more or fewer signals can be included in a scorecard 600.

The scoring signals can be identified (e.g., via query) from existing systems. Alternatively or additionally, the scoring signals can be generated or determined by one or more abuse detection tools. In the example of FIG. 6, the scoring signals are scored and the additional (extra) signals are either detected by the system ("Y") or not detected by the system ("N"). The additional (extra) signals are detected by the abuse detection tool, however, other (existing or non-existing) systems could also be involved in this detection process.

As discussed above, the commonalities score can indicate a measure of social traits that are common to both the source user and the target user. The social traits can be based on social relationship information (i.e., any information contained in the social networking system). Examples of social traits include, but are not limited to, users having one or more common social connections, users having common current or past residencies, and/or users having common interests. In one embodiment, the commonalities score comprises a people you may know (PYMK) score.

The coefficient score can indicate a measure of interactions between the source user and the target user in the social networking system. The measure of interaction can be based on a quantity or frequency of explicit actions taken by the source user with respect to the target user or taken by the target user with respect to the source user within a specified time period in the social networking system. The explicit actions can be, for example, any contact or communications between the source user and the target user in the social networking system. Examples of explicit actions include, but are not limited to, viewing items associated with the other user, liking items associated with the other user, or communicating with the other user.

Each target trait indicates whether the target user or target user account is associated with a pre-determined target trait. The pre-determined target trait can be, for example, the target user belonging to a sensitive affiliation, the target user being a celebrity, the target user having a familial relationship with the source user, the target user being a prior social connection of the source user in the social networking system, etc. In general, the target trait signals provide additional indications about potential improprieties. In one embodiment, sensitive affiliations can include, but are not limited to, military or government organizations, racially-related organizations, etc. Celebrities can include, but are not limited to, end-users with social connections that exceed a specified threshold (e.g., 1,000 or 10,000). Possible familial relationships can be determined based on, for example, common surname. Like other factors (or signals), the possible familial relationship can be determined even if the other signals indicate a small likelihood of connection between the source user and the target user.

An overt action factor can indicate whether a target user has taken a specific overt action with respect to the source user in the social networking system. For example, the specific overt action can be, but is not limited to, the target user blocking communications with the source user in the social networking system.

Social Networking System Overview

As mentioned above, embodiments of the present invention can be utilized within a social networking system. Typically, a social networking system includes one or more computing devices storing user profiles associated with users and/or other objects as well as connections between users and other users and/or objects. In use, users join the social networking system and then add connections to other users or objects of the social networking system to which they desire to be connected. The users may be individuals or entities such as businesses, organizations, universities, and/or manufacturers. The social networking system allows its users to interact with each other as well as with other objects maintained by the social networking system. In some embodiments, the social networking system allows users to interact with third-party websites and financial account providers.

Based on stored data about users, objects, and connections between users and/or objects, the social networking system can generate and maintain a "social graph" comprising a plurality of nodes interconnected by a plurality of edges. Each node in the social graph represents an object or user that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system can modify edges connecting the various nodes to reflect the interactions.

Figure 7:
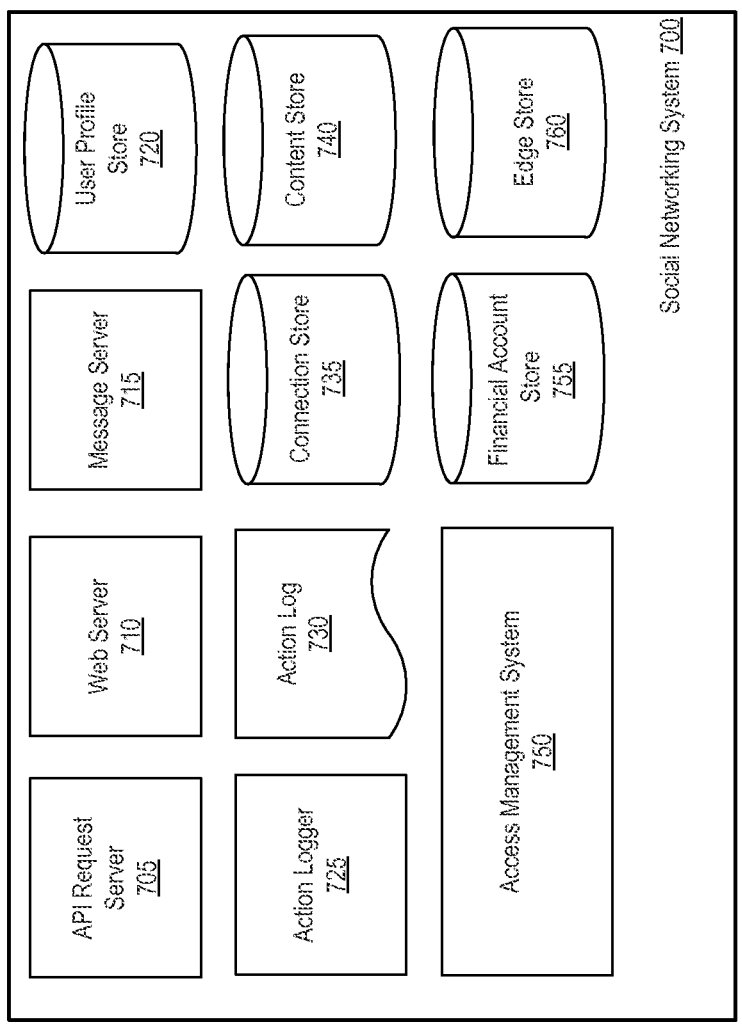
FIG. 7 is a block diagram of a system architecture of the social networking system with which some embodiments of the present invention may be utilized.

FIG. 7 is a block diagram of a system architecture of the social networking system 700 with which some embodiments of the present invention may be utilized. Social networking system 700 illustrated by FIG. 7 includes API request server 705, web server 710, message server 715, user profile store 720, action logger 725, action log 730, connection store 735, content store 740, access management system 750, financial account store 755, and edge store 760. Although not shown, some or all of the servers/stores etc. may comprise the storage management system discussed herein. In other embodiments, social networking system 700 may include additional, fewer, or different modules for various applications. Conventional components such as network interfaces, security mechanisms, load balancers, failover servers, management and network operations consoles, and the like are not shown so as to not obscure the details of the system architecture. Access management system 750 may be access management system 150 of FIG. 1, although alternative configurations are possible.

API request server 705 allows other systems, user devices, or tools to access information from social networking system 700 by calling APIs. The information provided by the social network may include user profile information or the connection information of users as determined by their individual privacy settings. For example, a system, user device, or tool attempting to access data connections within a social networking system may send an API request to social networking system 700 via a network. The API request is received at social networking system 700 by API request server 605. API request server 605 processes the request by submitting the access request to access management system 650 where access is determined and any data communicated back to the requesting system, user device, or tools via a network.

Web server 710 links social networking system 700 via a network to one or more client devices; the web server serves web pages, as well as other web-related content, such as Java, Flash, XML, and so forth. The web server 710 may communicate with the message server 715 that provides the functionality of receiving and routing messages between social networking system 700 and client devices. The messages processed by message server 715 can be instant messages, queued messages (e.g., email), text and SMS (short message service) messages, or any other suitable messaging technique. In some embodiments, a message sent by a user to another can be viewed by other users of social networking system 700, for example, by the connections of the user receiving the message. An example of a type of message that can be viewed by other users of the social networking system besides the recipient of the message is a wall post. In some embodiments, a user can send a private message to another user that can only be retrieved by the other user.

Each user of the social networking system 700 is associated with a user profile, which is stored in user profile store 720. A user profile includes declarative information about the user that was explicitly shared by the user, and may also include profile information inferred by social networking system 700. In one embodiment, a user profile includes multiple data fields, each data field describing one or more attributes of the corresponding user of social networking system 700. The user profile information stored in user profile store 720 describes the users of social networking system 600, including biographic, demographic, and other types of descriptive information, such as work experience, educational history, gender, hobbies or preferences, location and the like. A user profile may also store other information provided by the user such as, for example, images or videos. In certain embodiments, images of users may be tagged with identification information of users of social networking system 700 displayed in an image. A user profile in user profile store 720 may also maintain references to actions by the corresponding user performed on content items in content store 740 and stored in the edge store 760.

A user profile may be associated with one or more financial accounts, allowing the user profile to include data retrieved or derived from a financial account. A user may specify one or more privacy settings, which are stored in the user profile, that limit information from a financial account that social networking system 700 is permitted to access. For example, a privacy setting limits social networking system 700 to accessing the transaction history of the financial account and not the current account balance. As another example, a privacy setting limits social networking system 700 to a subset of the transaction history of the financial account, allowing social networking system 700 to access transactions within a specified time range, transactions involving less than a threshold transaction amount, transactions associated with specified vendor identifiers, transactions associated with vendor identifiers other than specified vendor identifiers, or any suitable criteria limiting information from a financial account identified by a user that is accessible by a social networking system 700. In one embodiment, information from the financial account is stored in user profile store 720. In other embodiments, it may be stored in financial account store 755.

Action logger 725 receives communications about user actions on and/or off social networking system 700, populating action log 730 with information about user actions. Such actions may include, for example, adding a connection to another user, sending a message to another user, uploading an image, reading a message from another user, viewing content associated with another user, and attending an event posted by another user, among others. In some embodiments, action logger 725 receives, subject to one or more privacy settings, transaction information from a financial account associated with a user and identifies user actions from the transaction information. For example, action logger 725 retrieves vendor identifiers from the financial account's transaction history and identifies an object, such as a page, in social networking system 700 associated with the vendor identifier. This allows action logger 725 to identify a user's purchases of products or services that are associated with a page, or another object, in content store 740. In addition, a number of actions described in connection with other objects are directed at particular users, so these actions are associated with those users as well. These actions are stored in action log 730.

Action log 730 may be used by social networking system 700 to track user actions on social networking system 700, as well as external websites that communicate information to social networking system 700. Users may interact with various objects on social networking system 700, including commenting on posts, sharing links, checking-in to physical locations via a mobile device, accessing content items in a sequence, or other interactions. Information describing these actions is stored in action log 730. Additional examples of interactions with objects on social networking system 700 included in action log 730 include commenting on a photo album, communications between users, becoming a fan of a musician, adding an event to a calendar, joining groups, becoming a fan of a brand page, creating an event, authorizing an application, using an application and engaging in a transaction. Additionally, action log 730 records a user's interactions with advertisements on social networking system 700 as well as other applications operating on social networking system 700. In some embodiments, data from action log 730 is used to infer interests or preferences of the user, augmenting the interests included in the user profile and allowing a more complete understanding of user preferences.

Action log 730 may also store user actions taken on external websites and/or determined from a financial account associated with the user. For example, an e-commerce website that primarily sells sporting equipment at bargain prices may recognize a user of social networking system 700 through social plug-ins that enable the e-commerce website to identify the user of social networking system 700. Because users of social networking system 700 are uniquely identifiable, e-commerce websites, such as this sporting equipment retailer, may use the information about these users as they visit their websites. Action log 730 records data about these users, including webpage viewing histories, advertisements that were engaged, purchases made, and other patterns from shopping and buying. Actions identified by action logger 725 from the transaction history of a financial account associated with the user allow action log 630 to record further information about additional types of user actions.

Content store 740 stores content items associated with a user profile, such as images, videos or audio files. Content items from content store 740 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social network system by displaying content related to users, objects, activities, or functionalities of social networking system 700. Examples of social networking content items include suggested connections or suggestions to perform other actions, media provided to, or maintained by, social networking system 700 (e.g., pictures or videos), status messages or links posted by users to the social networking system, events, groups, pages (e.g., representing an organization or commercial entity), and any other content provided by, or accessible via, the social networking system.

Content store 740 also includes one or more pages associated with entities having user profiles in user profile store 720. An entity is a non-individual user of social networking system 700, such as a business, a vendor, an organization or a university. A page includes content associated with an entity and instructions for presenting the content to a social networking system user. For example, a page identifies content associated with the entity's user profile as well as information describing how to present the content to users viewing the brand page. Vendors may be associated with pages in content store 740, allowing social networking system users to more easily interact with the vendor via social networking system 700. A vendor identifier is associated with a vendor's page, allowing social networking system 700 to identify the vendor and/or to retrieve additional information about the vendor from user profile store 720, action log 730, or from any other suitable source using the vendor identifier. In some embodiments, the content store 740 may also store one or more targeting criteria associated with stored objects and identifying one or more characteristics of a user to which the object is eligible to be presented.

In one embodiment, edge store 760 stores the information describing connections between users and other objects on social networking system 700 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in social networking system 700, such as expressing interest in a page on the social networking system, sharing a link with other users of the social networking system, and commenting on posts made by other users of the social networking system. Edge store 760 stores edge objects that include information about the edge, such as affinity scores for objects, interests, and other users. Affinity scores may be computed by social networking system 700 over time to approximate a user's affinity for an object, interest, and other users in social networking system 700 based on the actions performed by the user. Multiple interactions between a user and a specific object may be stored in one edge object in edge store 760, in one embodiment. In some embodiments, connections between users may be stored in user profile store 720, or user profile store 720 may access edge store 760 to determine connections between users.

Computer System Overview

Figure 8:
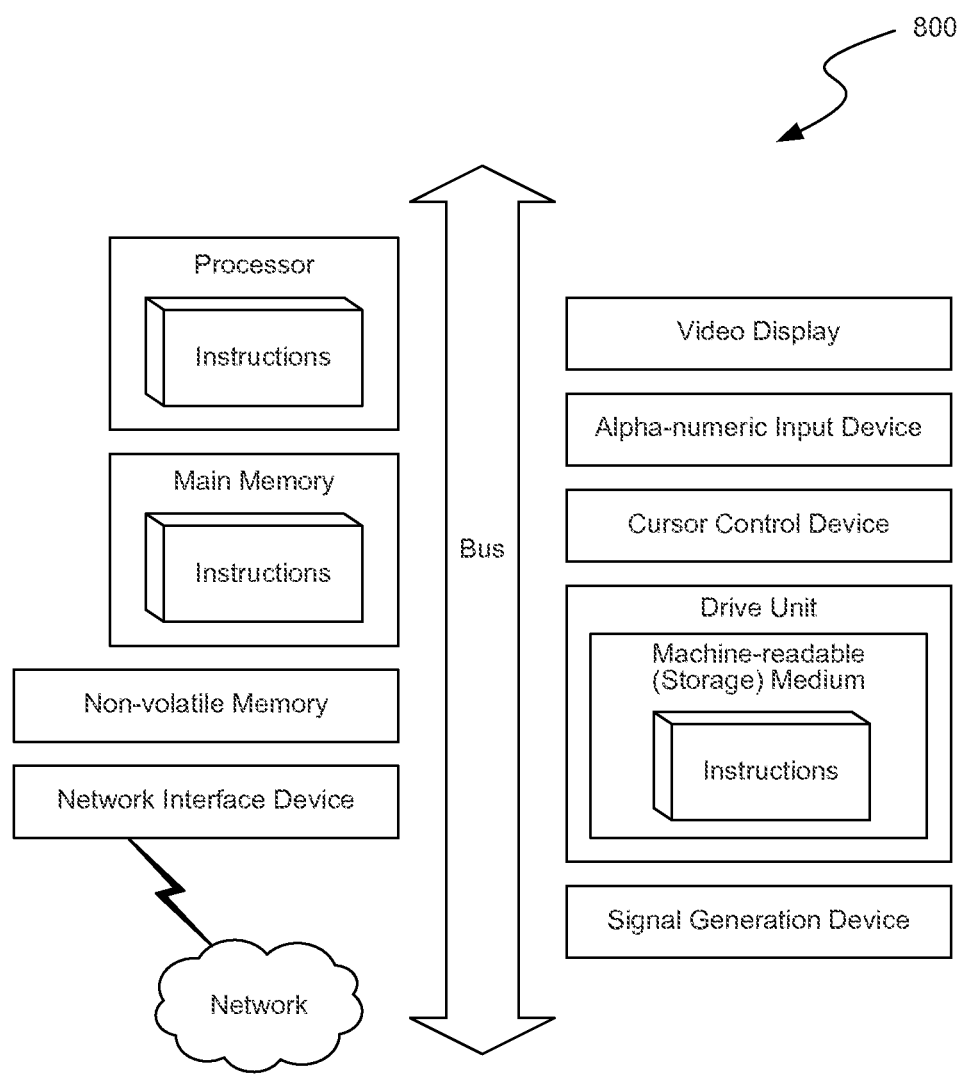
FIG. 8 shows a diagrammatic representation of a machine in the example form of a computer system.

FIG. 8 shows a diagrammatic representation of a machine in the example form of a computer system 800, within which a set of instructions for causing the machine to perform any one or more of the methodologies discussed herein may be executed.

In alternative embodiments, the machine operates as a standalone device or may be connected (networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone or smart phone, a tablet computer, a personal computer, a web appliance, a point-of-sale device, a network router, switch or bridge, or any machine capable of executing a set of instructions (sequential or otherwise) that specify actions to be taken by that machine.

While the machine-readable (storage) medium is shown in an exemplary embodiment to be a single medium, the term "machine-readable (storage) medium" should be taken to include a single medium or multiple media (a centralized or distributed database, and/or associated caches and servers) that store the one or more sets of instructions. The term "machine-readable medium" or "machine readable storage medium" shall also be taken to include any medium that is capable of storing, encoding or carrying a set of instructions for execution by the machine and that cause the machine to perform any one or more of the methodologies of the present invention.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine or computer-readable media include, but are not limited to, recordable type media such as volatile and non-volatile memory devices, floppy and other removable disks, hard disk drives, optical disks (e.g., Compact Disk Read-Only Memory (CD ROMs), Digital Versatile Discs, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for.") Accordingly, the applicant reserves the right to add additional claims after filing the application to pursue such additional claim forms for other aspects of the disclosure.

What is claimed is:

1. A computer-implemented method, comprising:
    dynamically granting, by a social networking system, private data access to a source user account to private data associated with a target user account by generating a unique token for a private data access tool and recording the private data access to enable the source user account to complete a transaction requested by an end-user corresponding to the target user account or to perform an authorized duty for the social networking system, wherein the social networking system stores a privacy setting that governs exposure of user information associated with the target user account and the privacy setting indicates at least a portion of the user information as private data normally inaccessible by the source user account;
    identifying, by the social networking system, the target user account;
generating, by the social networking system, a relationship scorecard including:
    determining a commonalities factor based on a plurality of social factors that together indicate a measure of social commonality between a source user associated with the source user account and a target user associated with the target user account, wherein the plurality of social factors are based on social relationship information residing in computer memory in the social networking system, the commonalities factor further determined based on a likelihood that the source user would connect with the target user in the social networking system,
    determining whether the target user account is associated with a pre-determined target trait, and wherein the pre-determined target trait includes the target user account having a number of social connections that exceeds a threshold number, wherein the social connections are edges, in a social graph of the social networking system, connecting one or more social network entity nodes to a target social network entity node associated the target user account, and
    determining a coefficient factor, separate from the commonalities factor, based on explicit user actions involving the target user account and the source user account, wherein the coefficient factor is based on a quantity or frequency of the explicit user actions taken by the source user with respect to the target user or taken by the target user with respect to the source user within a specified time period in the social networking system;
    detecting that the private data access is potentially abusive based on the commonality factor, coefficient factor, and the pre-determined target trait of the relationship scorecard; and
    notifying at least one administrator of the potentially abusive private data access.

2. The computer-implemented method of claim 1, wherein the commonalities factor is further based on common current or past residencies, or common interests.

3. The computer-implemented method of claim 1, wherein the explicit actions comprise one or more of viewing items associated with another user, liking items associated with another user, or communicating with another user.

4. The computer-implemented method of claim 1, wherein the pre-determined target trait comprises the target user having a prior connection with the source user in the social networking system.

5. Computer-implemented method of claim 1, wherein generating the relationship scorecard comprises:
   determining, by the social networking system, a blocking factor from the plurality of social factors, the blocking factor indicating whether the target user has blocked communications with the source user within the social networking system.

6. The computer-implemented method of claim 1, further comprising:
   applying, by the social networking system, a weight to one or more of the plurality of social factors.

7. The computer-implemented method of claim 1, wherein the private data access is accomplished using an access token.

8. The computer-implemented method of claim 1, further comprising:
   responsive to determining the private data access is potentially abusive, marking, by the social networking system, the private data access as potentially abusive; and
   sending, by the social networking system, one or more notifications indicating the potentially abusive private data access.

9. A computer-implemented method, comprising:
   dynamically granting, by a processor in a token access engine of a social networking system, private data access to a source use r account to access private data associated with a target user account by generating a unique token for a private data access tool and recording the private data access to enable the source user account to complete a transaction requested by an end-user corresponding to the target user account or to perform an authorized duty for the social networking system, wherein the social networking system stores a privacy setting that governs exposure of user information associated with the target user account and the privacy setting indicates at least a portion of the user information as private data normally inaccessible by the source user account;
   identifying, by a processor in a data access management system of the social networking system, the target user account;
   accessing, by the processor, social relationship information in computer memory on the social networking system, the social relationship information associated with the source user account and the target user account, respectively;
   processing the social relationship information to generate a commonalities score indicating a measure of common social traits shared by a source user associated with the source user account and a target user associated with a target user account, the commonalities score further determined based on a likelihood that the source user would connect with the target user in the social networking system;
   processing the social relationship information to generate a coefficient score indicating a measure of interactions between the source user and the target user in the social networking system, wherein the coefficient score is based on a quantity or frequency of the explicit user actions taken by the source user with respect to the target user or taken by the target user with respect to the source user within a specified time period in the social networking system;
   processing the social relationship information to determine whether the target user account is associated with a pre-determined target trait, wherein the pre-determined target trait comprises the target user account having a number of social connections that exceeds a threshold number, wherein the social connections are edges, in a social graph of the social networking system, connecting one or more social network entity nodes to a target social network entity node associated the target user account; and
   determining, by the processor, that the private data access is potentially abusive based on the commonalities score and the coefficient score
   wherein determining that the private data access is potentially abusive is further based on the target user account being associated with the pre-determined target trait; and
   notifying at least one administrator of the potentially abusive private data access.

10. The computer-implemented method of claim 9, further comprising:
    responsive to determining the private data access is potentially abusive, marking, by the social networking system, the private data access as potentially abusive.

11. The computer-implemented method of claim 10, further comprising:
    processing the social relationship information to determine whether the target user account has taken a pre-determined overt action with respect to the source user account in the social networking system,
    wherein determining whether the private data access is potentially abusive is further based on the target user account having taken the pre-determined overt action with respect to the source user account in the social networking system.

12. The computer-implemented method of claim 11, wherein the pre-determined overt action comprises the target user having blocked communications with the source user within the social networking system.

13. The computer-implemented method of claim 9, wherein determining whether the private data access is potentially abusive based on the commonalities score and the coefficient score comprises:
    combining the commonalities score and the coefficient score resulting in a combined score; and
    determining whether the combined score exceeds a threshold.

14. A computer readable data memory storing computer-executable instructions that, when executed by a computer system, cause the computer system to perform a computer-implemented method, the computer-executable instructions comprising:
    instructions for dynamically granting private data access to a source user account to private data associated with a target user account by generating a unique token for a private data access tool and recording the private data access to enable the source user account to complete a transaction requested by an end-user corresponding to the target user account or to perform an authorized duty for the social networking system, wherein the social networking system stores a privacy setting that governs exposure of user information associated with the target user account and the privacy setting indicates at least a portion of the user information as private data normally inaccessible by the source user account;

instructions for identifying the source user account;

instructions for scanning the source account for private data accesses and identify target user account; and instructions for generating a relationship scorecard including a plurality of social factors that together indicate a measure of social connectedness between a source user associated with the source user account and a target user associated with the target user account, wherein the plurality of social factors are based on social relationship information residing in computer memory in a social networking system, wherein generating the relationship scorecard includes determining a likelihood that the source user would connect with the target user in the social networking system, wherein generating the relationship scorecard includes determining whether the target user account is associated with a pre-determined target trait, and wherein the pre-determined target trait has social connections that exceed a threshold number, wherein the social connections are edges, in a social graph of the social networking system, connecting one or more social network entity nodes to a target social network entity node associated the target user account;

instructions for determining, as part of a data access management system for the social networking system, that the private data access is potentially abusive using the relationship scorecard; and instructions for accessing, via the data access management system, at least some of the social relationship information in one or more social networking databases residing in computer memory in the social networking system.

15. An abusive access detection system, comprising:

one or more processors;

a storage device having computer-readable instructions stored thereon, that, when executed by the one or more processors, cause the one or more processors to:

dynamically grant private data access to a source user account to access private data associated with a target user account by generating a unique token for a private data access tool and recording the private data access to enable the source user account to complete a transaction requested by an end-user corresponding to the target user account or to perform an authorized duty for the social networking system, wherein the social networking system stores a privacy setting that governs exposure of user information associated with the target user account and the privacy setting indicates at least a portion of the user information as private data normally inaccessible by the source user account;

identify the target user account;

generate a relationship scorecard including a plurality of social factors that together indicate a measure of social connectedness between a source user associated with the source user account and a target user associated with the target user account, wherein the plurality of social factors are based on social relationship information residing in computer memory in the social networking system, wherein generating the relationship scorecard includes determining a likelihood that the source user would connect with the target user in the social networking system, wherein gene rating the relationship scorecard includes determining whether the target user account is associated with a pre-determined target trait, and wherein the predetermined target trait includes the target user account having social connections that exceed a threshold number, wherein the social connections are edges, in a social graph of the social networking system, connecting one or more social network entity nodes to a target social network entity node associated the target user account;

determine, as part of a data access management system for the social networking system, that the private data access is potentially abusive using the relationship scorecard; and notify at least one administrator of the potentially abusive private data access.

* * * * *